United States Patent [19]
Herndon

[11] Patent Number: 4,765,570
[45] Date of Patent: Aug. 23, 1988

[54] AIRCRAFT EJECTED SEAT STABILIZING AND DELAYED PARACHUTE SYSTEM
[75] Inventor: Gerald F. Herndon, Bellevue, Wash.
[73] Assignee: The Boeing Company, Seattle, Wash.
[21] Appl. No.: 781,658
[22] Filed: Sep. 30, 1985
[51] Int. Cl.4 .............................................. B64D 25/10
[52] U.S. Cl. ................................ 244/122 AE; 244/141
[58] Field of Search ............... 244/142, 141, 147, 148, 244/149, 150, 122 A

[56] References Cited
U.S. PATENT DOCUMENTS

| 2,610,815 | 9/1952 | Smith | 244/141 |
| 3,436,037 | 4/1969 | Stanley | 244/149 |
| 3,603,536 | 9/1971 | Dochow | 244/142 |
| 4,004,764 | 1/1977 | Burklund et al. | 244/141 |
| 4,175,722 | 11/1979 | Higgins | 244/145 |

FOREIGN PATENT DOCUMENTS

| 514061 | 6/1955 | Canada | 244/122 R |
| 748022 | 4/1956 | United Kingdom | 244/141 |

Primary Examiner—Jeffrey V. Nase
Assistant Examiner—Lynn M. Fiorito
Attorney, Agent, or Firm—Seed and Berry

[57] ABSTRACT

A system and method for stabilizing an aircraft ejection seat and crew member after seat ejection and prior to main parachute inflation. The system also providing for delayed opening of the main chute until air speed and altitude have decreased to an acceptable parachute inflation range.

18 Claims, 4 Drawing Sheets

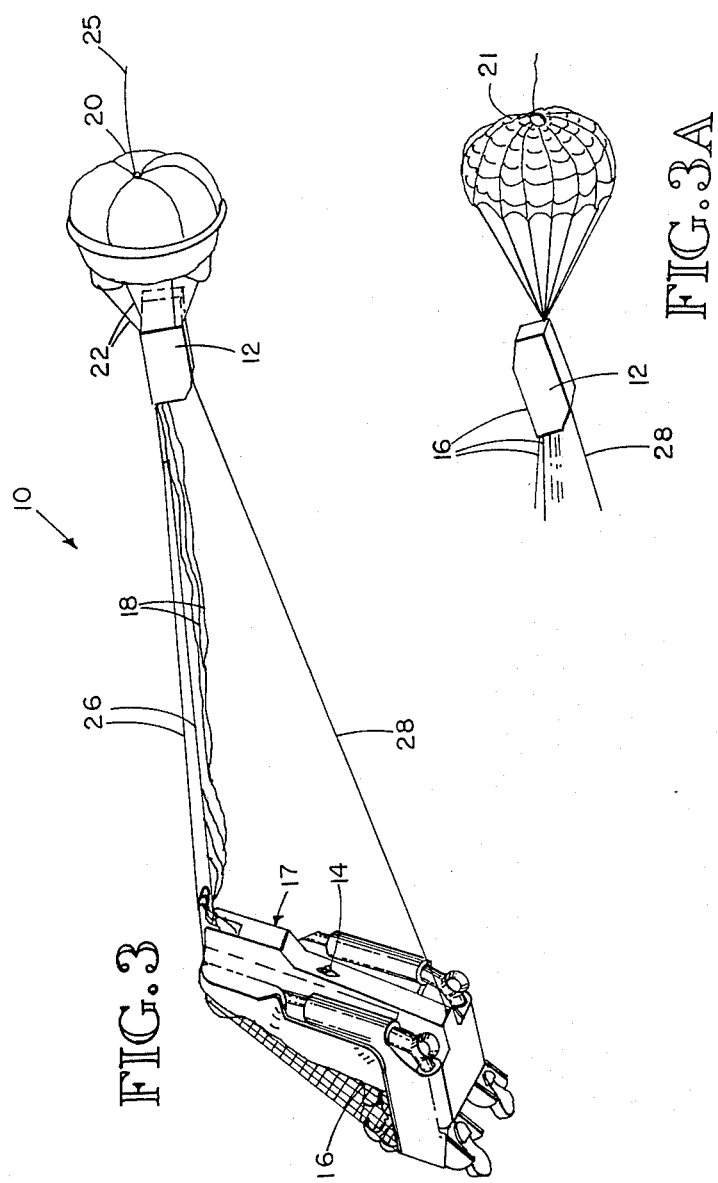

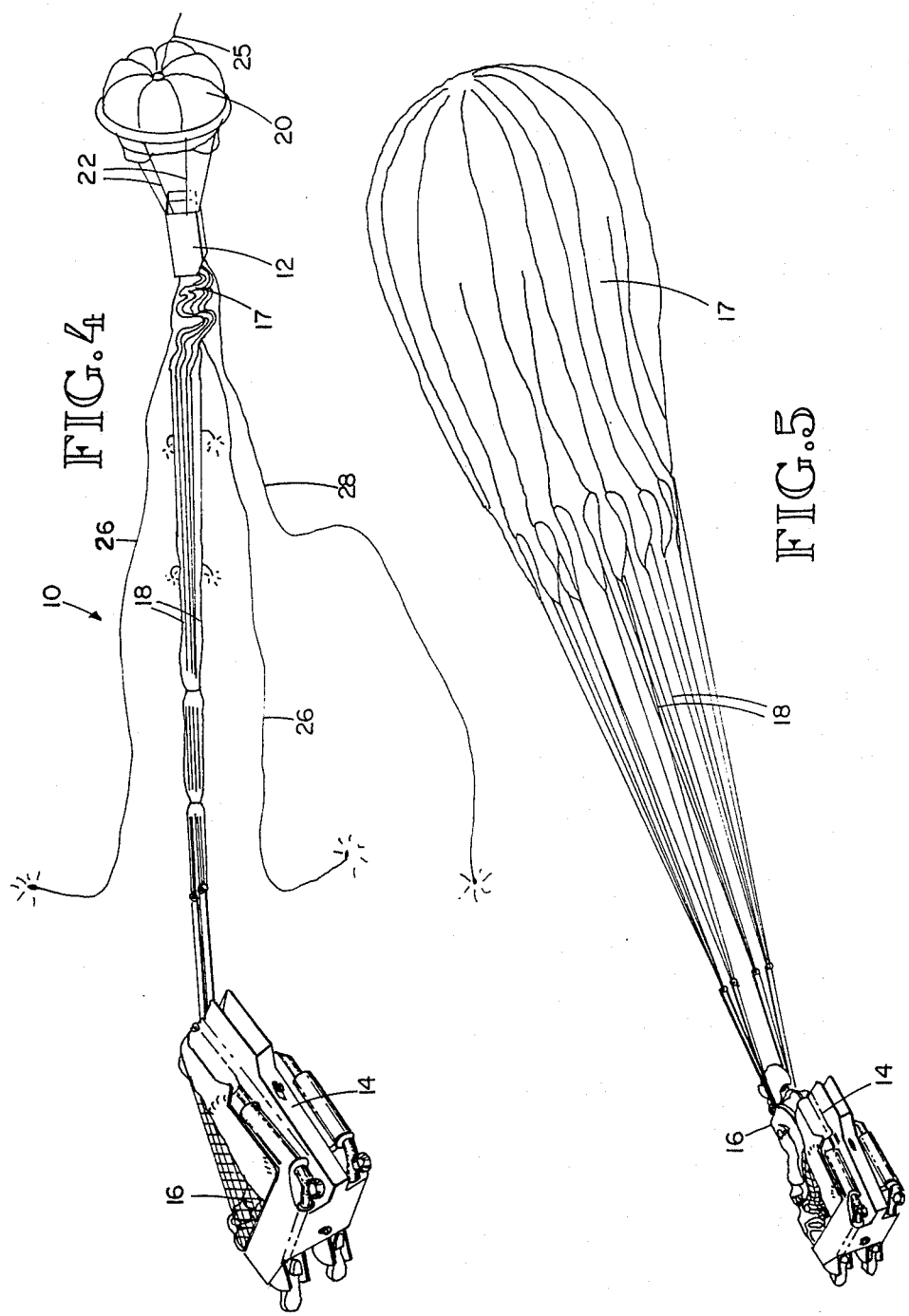

AIRCRAFT EJECTED SEAT STABILIZING AND DELAYED PARACHUTE SYSTEM

This invention was made with Government support under Contract No. F33615-84-C-0518 award by the U.S. Air Force. The Government has certain rights in this invention.

BACKGROUND OF THE INVENTION

This invention relates to a parachute system for a high speed aircraft and more particularly, but not by way of limitation, to a system for stabilizing an ejected aircraft seat and pilot or crew member during early deployment and delaying the opening of the main recovery parachute.

Ejection seats currently being used in high performance military aircraft are inherently unstable during free flight. In order to prevent excessive dynamic loads on the seat occupant after ejection, due to uncontrolled gyrations, the seat must be stabilized immediately after separation from the ejection guide rails in the aircraft. Present ejection seats deploy a drogue or pilot parachute to accomplish this stabilizing function and position the seat in a near upright attitude as the seat is decelerated to a low enough velocity for the recovery or main parachute to be deployed.

The pilot parachute also stabilizes the ejected seat as it descends from a high altitude to an altitude in the range of 15,000 feet at which time the main parachute is deployed. To prevent entanglement of the parachute, the pilot chute must be detached from the seat before the main parachute is inflated. There is a period of time between the release of the pilot chute and full deployment of the main chute during which the seat and the pilot combination has no stabilizing force applied thereto. Because of the inherent seat instability the seat will begin to tumble during this unrestrained period so that the seat could be in an adverse attitude at the time the main parachute opening shock is applied. If the parachute loads, which may be as high as 17 g's, are imposed on the pilot in a direction which is not approximately aligned with the spine serious injury can result. Therefore, it is important to be able to deploy the main parachute as rapidly as possible, certainly within 5 seconds from parachute deployment initiation to line stretch, in order to minimize the time during which the seat has no stabilizing force prior to main parachute opening shock.

Currently, aircraft ejection seats have a recovery system sequence which causes the pilot parachute to be detached from the ejected seat at 0.15 seconds after the main parachute deployment is initiated. The fixed time delay is intended to allow the main parachute deployment bag to reach a position just short of the pilot chute position before the pilot chute is detached. This delay is in order to avoid entanglement of the pilot chute and main chute, and still minimuze the unstabilized period between the pilot chute release and main parachute line stretch. Also, the main parachute can be deployed without first deploying the pilot chute in order to minimize the main chute's deployment time, but the seat attitude is uncontrolled and adverse attitude is likely.

Therefore, new aircraft ejection seat technology is now being developed which makes it possible to stabilize the seat with a controlled propulsion system for as long as 0.15 seconds after separation from the aircraft. This time period allows for a longer time for the pilot chute deployment. Ejection under high dynamic pressure conditions makes it desirable to delay the pilot chute deployment to avoid excessive seat deceleration which could be injurious to the seat occupant. Once the pilot chute is deployed, seat stability can be maintained aerodynamically. But, the problem of instability during the period of transition from the pilot chute to main parachute still exists since the propulsion attitude control system will already be exhausted by the time an accepted main parachute inflation velocity is reached. The subject invention provides a system and method for reducing the period of instability between the pilot chute release and main parachute line stretch and deployment.

In the following U.S. Pat. Nos. 3,027,126 to Wallace, 3,191,892 to Fuller et al, 3,861,625 to Sadler et al, 3,926,391 to Nordine, and 4,004,764 to Burklund et al, various types of aircraft parachute systems, parachute spreaders, and deployment systems are described. None of the prior art patents describe the unique system as described herein for providing early deployment seat stabilization and delaying the opening of the main parachute.

SUMMARY OF THE INVENTION

The subject system provides for stabilizing an aircraft seat and pilot after seat ejection and prior to main chute inflation.

The system also provides for delayed opening of the main chute until air speed and altitude have been decreased to an acceptable parachute inflation range.

The pilot chute is designed for inflation by wind blast or may be ram air inflatable.

The main recovery parachute bag is deployed from the aircraft as part of the pilot chute.

The deployment bag is restrained by bridle lines to delay bag strip off and main parachute inflation until air speed and altitude is decreased.

The system for stabilizing an aircraft seat and crew member after seat ejection and prior to main chute inflation includes a main parachute canopy restrained in a parachute deployment bag with a pilot chute attached thereto. The main parachute canopy is held in the deployment bag with chute suspension lines partially deployed. The main chute deployment bag is restrained through the use of a plurality of bridle lines which prevent the bag from being stripped from the packed main chute canopy. When the bridle lines are released the pilot chute completes the main chute deployment by stripping the bag and allowing the canopy to inflate.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 illustrates a steady state deployed orientation of the pilot chute for stabilizing the seat.

FIG. 3A illustrates an alternate embodiment of the pilot chute.

FIG. 4 illustrates the release of the bridle lines and the main chute bag being ripped away by the pilot chute.

FIG. 5 illustrates the main chute just prior to full deployment and prior to the seat being released from the crewman.

DETAILED DESCRIPTION OF THE DRAWINGS

Figure 1:
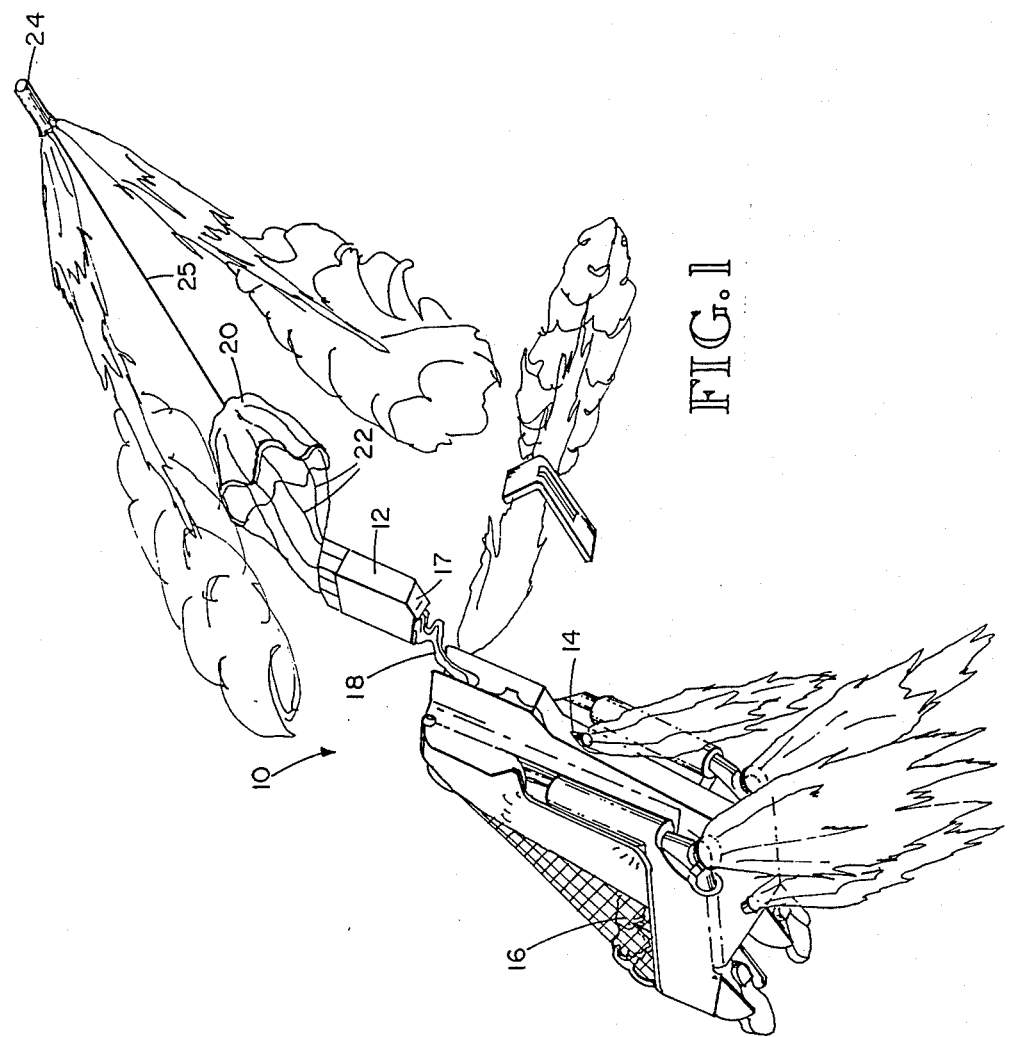
FIG. 1 illustrates an aircraft ejection seat and crew member just after ejection and prior to deployment of the pilot chute.

In FIG. 1 the system for early deployment aircraft seat stabilization and delayed opening of the main parachute is designated by general reference numeral 10. The system 10 includes a main chute bag 12 releasably attached to the rear of an ejected aircraft seat 14 holding an aircraft pilot or crew member 16 therein. The main chute bag 12 includes a main chute canopy 17 stored therein. The canopy 17 is attached to partially deployed parachute suspension lines 18 shown in FIG. 2. Attached to the top of the bag 12 is a pilot parachute 20 having suspension lines 22.

In operation a tractor rocket 24 or similar device is attached to the apex of the pilot chute 20 via line 25 and is used to extract the pilot chute 20 and the deployment bag 12 from the rear of the seat 14. The pilot chute 20 as shown is ram air inflatable or a standard drogue chute 21 may be used which also is extracted by the tractor rocket 24. The drogue chute 21 is shown in FIG. 3A and is inflated by the wind blast after ejection. The additional drag force on the deployment bag 12 will cause the bag to reach a bridle line stretch in less than 0.25 seconds.

Figure 2:
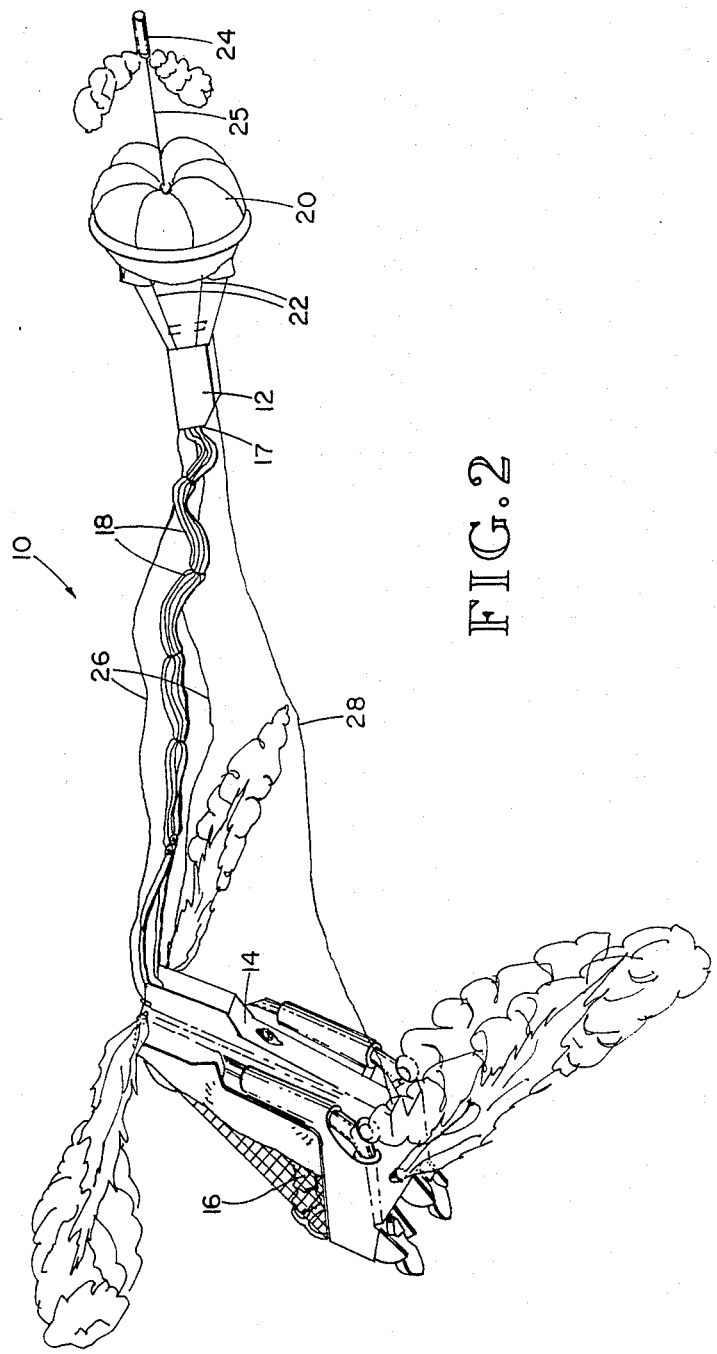
FIG. 2 illustrates a transient condition during initial pilot chute deployment.

In FIG. 2 a pair of upper bridle lines 26 and a lower bridle line 28 are shown attached to the bag 12 and the top and bottom of the rear of the seat 14. It has been found that a larger tractor rocket 24 will be required when compared with rockets used with conventional drogue or pilot chutes because of the increased mass when attached to the main chute bag 12.

In FIG. 3 the pilot chute 20 has reached full deployment and the system 10 will now be able to maintain seat stability. Note the bridle lines 26 and 28 are under full stretch with the main chute lines 18 restrained in a trailing relationship behind the seat 14.

The ram air inflatable chute 20 has been found to be more stable and effective at supersonic speeds than a typical drogue type of pilot parachute 21 shown in FIG. 3A having a ring slot or hemisflow chute design. The ram air inflatable chute 20 is integrated directly into the top of the deployment bag 12 as shown.

The bridle lines 26 and 28 connected to the main chute deployment bag 12 are released in a sequential manner leading to the main parachute inflation as shown in FIG. 5. The single lower bridle line 28 is played out at a controlled rate until the seat 14 is tilted back and is within 20 degrees of the streamlines of the air flow. The two upper lines 26 are then released along with the lower line 28 allowing the drag force caused by the pilot chute 20 to strip the deployment bag 12 from the main chute canopy 17 as shown in FIG. 4 followed by main chute inflation as shown in FIG. 5. The crew member 16 is then separated from the seat 14.

From reviewing the above-mentioned drawings it can be seen through the use of the pilot chute 20 attached to the main chute bag 12 along with the use of the bridle lines 26 and 28, bag strip off of the main chute canopy 17 of the main recovery parachute is delayed until air speed and altitude have been decreased to an acceptable parachute inflation range. At this time the restraining bridle lines are released, and the parachute suspension lines 18 reach full stretch as the main chute bag 12 is ripped from the canopy 17 and the pilot is safely separated from the seat 14 with full deployment of the main chute.

Changes may be made in the construction and arrangement of the parts or elements of the embodiments as described herein without departing from the spirit or scope of the invention defined in the following claims.

What is claimed is:

1. A system for stabilizing crew member and aircraft seat after seat ejection and prior to main chute inflation, the system comprising:
    a pilot parachute attached to a main chute deployment bag, the bag storing a main chute canopy therein;
    pilot chute deployment means attached to the pilot chute for inflating the pilot chute upon ejection of the aircraft seat;
    a plurality of restraining bridle lines attached to the rear of the seat and the main chute bag to secure said main chute deployment bag to said aircraft seat;
    a suspension line extending from said main chute canopy to said crew member or aircraft seat, said suspension line being slack when said bridle lines are connecting said main chute deployment bag to said aircraft seat; and
    means for releasing said main chute deployment bag from said seat thereby allowing said pilot parachute to strip said main chute deployment bag from said main chute canopy in order to deploy said main chute canopy.

2. The system as described in claim 1 wherein the pilot chute is ram air inflatable.

3. The system as described in claim 1 wherein the bridle lines include a pair of upper bridle lines attached to the bag and the top of the rear of the seat and a single bridle line attached to the bag and the bottom of the rear of the seat for holding the seat in an upright position in the streamlines of the airflow.

4. The system as described in claim 1 wherein the pilot chute deployment means is a rocket.

5. The system as described in claim 1 wherein said means for releasing said main chute deployment bag from said pilot parachute operates by releasing said bridle lines from said seat.

6. A system for stabilizing a crew member and aircraft seat after seat ejection and prior to main chute inflation, the system comprising:
    a pilot parachute attached to a main chute deployment bag, the bag storing a main chute canopy therein;
    a main chute suspension line extending from said canopy to said crew member or aircraft seat;
    a plurality of restraining bridle lines attached to the rear of the seat and the main chute bag, the pilot chute stabilizing the crew member and seat during initial ejection of the seat, the bridle lines restraining the main chute suspension lines less than full stretch and restraining bag strip off by the pilot chute until an acceptable altitude and air speed is reached; and
    means for releasing said main chute deployment bag from said seat thereby allowing said pilot parachute to strip said main chute deployment bag from said main chute canopy in order to deploy said main chute canopy.

7. The system as described in claim 6 wherein the bridle lines include a pair of upper bridle lines attached to the main chute deployment bag and the top of the rear of the ejection seat and a bridle line attached to the main chute deployment bag and the bottom of the rear of the ejection seat for holding the seat in an upright position in the streamlines of the airflow.

8. The system as described in claim 7 wherein said means for releasing said main chute bag from said pilot parachute operates by releasing said bridle lines from said seat.

9. The system as described in claim 8 wherein said bridle lines are released from said seat in a sequential manner in which said lower bridle line is payed out at a controlled rate until said seat is inclined rearwardly with respect to the streamlines of the airflow and said upper bridle lines are then released along with said lower bridle line, thereby allowing the drag force caused by the pilot chute to strip said main chute deployment bag from said main chute canopy.

10. The system as described in claim 6 wherein said means for releasing said main chute bag from said pilot parachute operates by releasing said bridle lines from said seat.

11. A method for stabilizing a crew member and aircraft seat after ejection and prior to main chute inflation, the system comprising:
   deploying a pilot parachute attached to a main chute deployment bag, the bag storing a main parachute canopy therein;
   restraining the main chute bag in a trailing manner behind the rear of the seat using a plurality of bridle lines;
   releasing the bridle lines from the rear of the ejected seat;
   ripping the main chute bag from the canopy therein using the pilot parachute; and
   releasing the seat from crew member with the crew member suspended from the inflated main chute.

12. The method as described in claim 11 further including the step of restraining main chute suspension lines attached to the stored canopy in the bag in less than full stretch by the bridle lines prior to releasing the lines.

13. The method as described in claim 11 further including the step of sequentially releasing the bridle lines from the rear of the ejected seat.

14. An ejection seat parachute system for allowing a crew member to safely eject from an aircraft, said system comprising:
   a main chute deployment bag;
   a main chute canopy contained within said main chute deployment bag;
   a main chute suspension line extending from said main chute canopy to said ejection seat for crew members;
   a plurality of bridle lines extending from said main chute deployment bag to said ejection seat, said bridle lines having a length relative to the length of said main chute suspension line selected to keep said suspension line slack when said bridle lines are taut, said bridle lines keeping said main chute canopy in said main chute deployment bag; and
   means for releasing said main chute deployment bag from said ejection seat, thereby allowing said main chute canopy to be stripped from said main chute deployment bag.

15. The ejection seat parachute system of claim 14 wherein said bridle lines include a pair of upper bridle lines extending between said main chute deployment bag and the rear of said ejection seat and a lower bridle line extending from said main chute deployment bag to the bottom of said ejection seat for holding said seat in an upright position in the stream lines of said airflow.

16. The ejection seat parachute system of claim 15 wherein said bridle lines are released from said seat in a sequential manner in which said lower bridle line is payed out at a controlled rate until said seat is inclined rearwardly with respect to the streamlines of the airflow and said upper bridle lines are then released along with said lower bridle line, thereby allowing the drag force caused by the pilot chute to strip said main chute deployment bag from said main chute canopy.

17. The ejection seat parachute system of claim 14 wherein said means for releasing said main chute deployment bag from said ejection seat operates by releasing said bridle lines from said seat.

18. The ejection seat parachute system of claim 14 further including a pilot chute attached to said main chute deployment bag for increasing the drag exerted on said main chute deployment bag in order to assist in stripping said main chute deployment bag from said main canopy when said main chute deployment bag is released from said ejection seat.

* * * * *